United States Patent
Sorvari et al.

(10) Patent No.: US 9,727,564 B2
(45) Date of Patent: Aug. 8, 2017

(54) ANNOTATING CONTENT WITH CONTEXT METADATA (75) Inventors: Antti Sorvari, Itäsalmi (FI); Joonas Paalasmaa, Helsinki (FI); Jukka-Pekka Salmenkaita, Helsinki (FI)

(73) Assignee: Nokia Technology Oy, Espoo (FI)

( * ) Notice: Subject to any disclaimer, the term of this patent is extended or adjusted under 35 U.S.C. 154(b) by 1203 days.

(21) Appl. No.: 12/086,667

(22) PCT Filed: Dec. 15, 2005

(86) PCT No.: PCT/GB2005/004857
§ 371 (c)(1),
(2), (4) Date: Apr. 5, 2010

(87) PCT Pub. No.: WO2007/068864
PCT Pub. Date: Jun. 21, 2007

(65) Prior Publication Data
US 2010/0198835 A1  Aug. 5, 2010

(51) Int. Cl.
G06F 17/30  (2006.01)
G06F 15/16  (2006.01)

(52) U.S. Cl.
CPC .............. *G06F 17/30038* (2013.01)

(58) Field of Classification Search
None
See application file for complete search history.

(56) References Cited

U.S. PATENT DOCUMENTS

| 5,802,361 A | 9/1998 | Wang et al. |
| 7,336,928 B2 | 2/2008 | Paalasmaa et al. |
| 7,599,950 B2 * | 10/2009 | Walther et al. |
| 2005/0216457 A1 | 9/2005 | Walther et al. |
| 2007/0118560 A1 * | 5/2007 | Bornhoevd et al. ....... 707/104.1 |
| 2008/0147798 A1 | 6/2008 | Paalasmaa et al. |

OTHER PUBLICATIONS

Nikolay Nadejdin "Karmannye kompyutery" ("Pocket Computers"), Saint Petersburg, Russia, BVH-Peterburg, 2002, pp. 9, 11, 15, 15 (in Russian text only), (4 pages).
"Context for Semantic Metadata" by K. Haase; Oct. 10-16, 2004, pp. 204-211, XP-002374238.
"From Context to Content: Leveraging Context to Infer Media Metadata" by M. Davis et al; Oct. 10-16, 2004, pp. 1-8, XP002374239.

(Continued)

*Primary Examiner* — Alex Gofman
(74) *Attorney, Agent, or Firm* — Alston & Bird LLP (57) ABSTRACT

A method and corresponding apparatus, computer program instructions, and graphical user interface are provided for annotating content with context metadata. The method includes obtaining by an apparatus a first list of context metadata items for a content item where the context metadata items include information relating to devices which were nearby the apparatus when the content item was created; obtaining a second list of context metadata items, wherein the second list contains some, but not all, of the metadata items of the first list; and annotating the content item with the second list by creating an association between metadata items of the second list and the content item.

31 Claims, 2 Drawing Sheets

(56) References Cited

OTHER PUBLICATIONS

"Metadata Based Annotation Infrastructure offers Flexibility and Extensibility for Collaborative Applications and Beyond" by M. Koivunen et al; Sep. 2004, pp. 1-4, XP002374240.
"Metadata in Science Publishing" by A. de Waard et al; 2003, pp. 1-11, XP002374241.
"Usability Issues in Utilizing Context Metadata in Content Management of Mobile Devices" by A. Sorvari et al; NordiCHI '04, Oct. 23-27, 2004, Tampere, Finland, pp. 357-363, XP002374242.
"Web Annotation Service" by V. Vasudevan et al; Sep. 15, 1998, pp. 1-9, XP002374243.
English Translation of Russian Office Action issued Aug. 14, 2009 in corresponding Russian Patent Application No. 2008123117/09 (6 pages).
Office Action from Russian Patent Application No. 2011122590/08(033478), dated May 18, 2012.
International Search Report and Written Opinion from International Application No. PCT/GB2005/004857 dated Apr. 7, 2006.

\* cited by examiner

ANNOTATING CONTENT WITH CONTEXT METADATA

FIELD OF THE INVENTION

Embodiments of the present invention relate to annotating content with context metadata. In particular, they relate to a method, a device and a computer program that makes context metadata more meaningful and facilitates the annotation of content with meaningful metadata.

BACKGROUND TO THE INVENTION

Increasing storage capacity enables users to store very large amounts of content to their mobile phones and other small, portable electronic devices. While the amount of content that should be managed is increasing dramatically the physical UI (User Interface) will not change considerably. The display resolutions will increase but the physical display sizes will probably not increase much since in already existing phones the display covers a large part of the surface area. Text input speed is not likely to increase considerably. Other than keyboard-based text input, the other various methods (e.g. stylus-based) have not proven to solve the difficulty and slowness of text input and the overall phone size miniaturization and display size increase needs leave less and less space for keyboards.

There is a seemingly unbalanced development of the amount of stored content and the physical phone user interface (UI).

One solution by Sorvari et al.: "Usability issues in utilizing context metadata in content management of mobile devices." NordiCHI '04: Proceedings of the third Nordic conference on Human-computer interaction, ACM Press: 357-363 suggests that context metadata may be used to enhance content management.

Context metadata is information that describes the context when content is created (or received). This context metadata can be used to annotate the content item. This facilitates efficient content management features such as searching and also facilitates organization features.

However, the context metadata may be 'contaminated' with metadata that is meaningless to a user. For example, if the context metadata includes the identities of nearby devices, then some of these devices may have meaning to the user, such as the devices of friends, whereas other devices will have no meaning such as the devices of passers by. The contamination of meaningful metadata by meaningless metadata may prevent the effective use of contextual metadata.

When a user wishes to annotate a content item with contextual metadata, there may be a problem in selecting meaningful contextual metadata from the available contextual metadata. Meaningless contextual metadata contaminates the meaningful contextual metadata.

Likewise when a user accesses metadata that is stored in association with content, there may be a problem in displaying only meaningful contextual metadata from the stored contextual metadata.

BRIEF DESCRIPTION OF THE INVENTION

It would be desirable to provide a way of using contextual metadata without suffering the problem of contamination.

According to a first embodiment of the invention there is provided a method of annotating content with context metadata comprising: a) obtaining a first list of context metadata items for a content item; b) obtaining a second list of context metadata items from the first list, wherein the second list contains some, but not all, of the metadata items of the first list; and c) annotating the content item with the second list by creating an association between metadata items of the second list and the content item.

According to another embodiment of the invention there is provided an electronic device for annotating content items with context metadata, the device comprising: a memory for storing a first list of context metadata items for a content item and the content item; and a processor for obtaining a second list of context metadata items from the first list, wherein the second list contains some, but not all, of the metadata items of the first list and for annotating the content item with the second list by creating associations between metadata items of the second list and the content item.

According to another embodiment of the invention there is provided a computer program for annotating content items with context metadata comprising computer program instructions which when loaded into a processor enable the processor to:

a) obtaining a second list of context metadata items from a first list of context metadata items for a content item, wherein the second list contains some, but not all, of the metadata items of the first list; and b) annotating the content item with the second list by creating an association between metadata items of the second list and the content item.

According to another embodiment of the invention there is provided a graphical user interface means in which context metadata items are displayed for selection by a user, the user interface means providing means for highlighting some of the context metadata items relative to other of the context metadata items to aid user selection of meaningful metadata items.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

Figure 1:
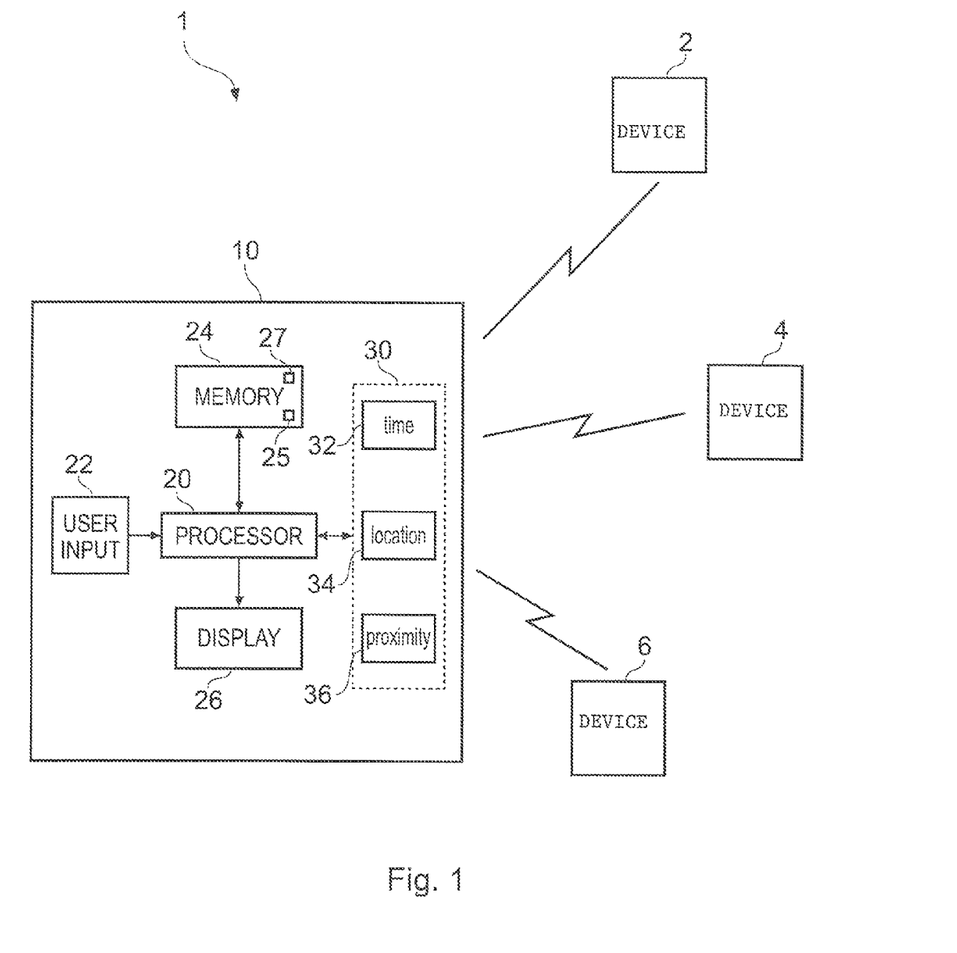
FIG. 1 illustrates an arrangement 1 of devices.
Figure 2:
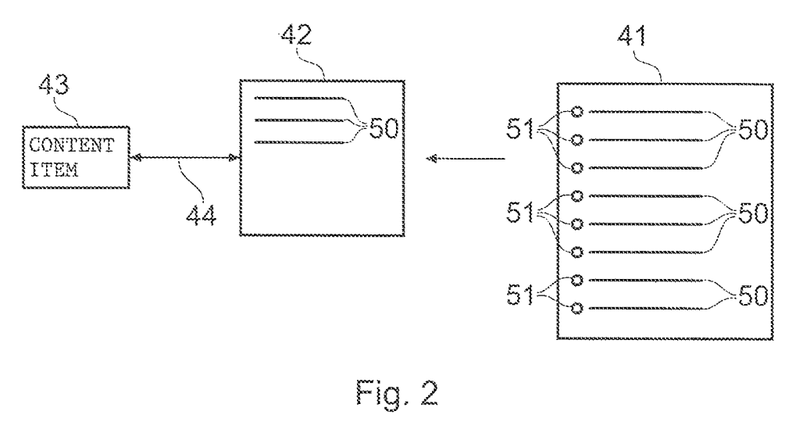
FIG. 2 illustrates the relationship between a first list of context metadata items and a second list of context metadata items which are used to annotate a content item.
Figure 3:
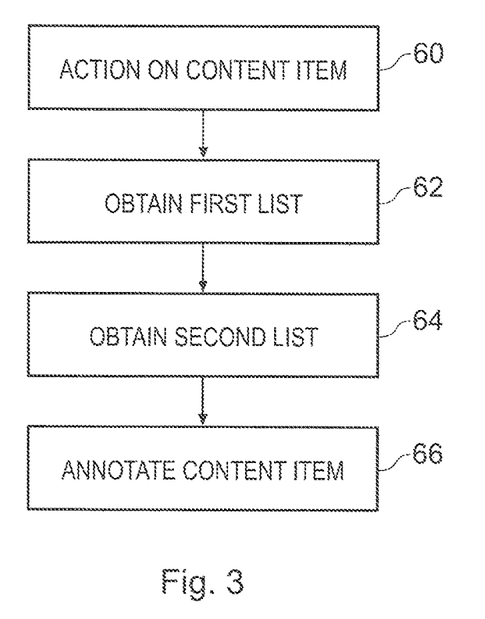
FIG. 3 schematically illustrates a process of annotating a content item with metadata items according to an embodiment of the invention.

The Figures illustrate a method of annotating a content item 43 with context metadata items 50 comprising:

a) obtaining a first list 41 of context metadata items 50 for a content item 43;

b) obtaining a second list 42 of context metadata items 50 from the first list 41, wherein the second list 42 contains some, but not all, of the metadata items 50 of the first list 41; and c) annotating the content item with the second list by creating an association 44 between metadata items 50 of the second list 42 and the content item 43.

Information relating to location, time, data and the proximal environment when an action occurs at a user device in relation to a content item 43 can be used as context metadata for that content item 43. The action may be, for example, one of creating, receiving, or editing the content item 43. This metadata makes information available over and above that present in the content item itself. The context metadata may be considered as a collection of metadata items 50, which provide different information. Suitable metadata items 50 may include: time, date, location, nearby devices (and for each nearby device its position and/or distance from the user device).

The content item 43 is annotated with the context metadata items 50 collected when the action occurred at the user device 10 in relation to the content item 43. This annotation is achieved by creating an association 44 between metadata items 50 of the context metadata with the content item 43. The annotation enables organization of the content item 43 based on the context metadata items 50 and/or searching for the content item using the context metadata items 50.

Information about the proximal environment to the user device 10 can be determined by, for example, receiving identifiers transmitted by local radio devices 2, 4, 6. One type of identifier may indicate a network area in which the local device 10 is situated. For example, the identifier may be a SSID (service set identification) for a WLAN (wireless local area network) network or a combination of network ID (identification) and cell ID for a cellular telecommunications network, Another type of identifier may indicate the presence of a device nearby. For example, according to the Bluetooth Standard, a Bluetooth (BT) device can perform an inquiry procedure that allows it to obtain the BT device IDs and also the BT friendly names from the local BT devices. Either the BT device ID or BT friendly name may be used as an identifier. Some BT devices may be fixed, in which case the device identifier specifies a location whereas other BT devices may be user portable devices, such as mobile cellular telephones, which indicate the presence of a particular user.

The context metadata items 50 and particularly the metadata identifying nearby devices (device identifiers) can be used to considerably enhance the automatic organization and search capabilities that the user device 10 provides. In addition, these metadata items 50 can be also made available in other devices such as PCs to enhance the content management in other devices.

Automatic detection of context metadata means that in many cases the context metadata is "contaminated" with information that is not meaningful to the user. For example, if the user device captures an image in a public place, it is quite likely that some nearby devices are not meaningful to the user but will be included in the context metadata. These devices may be owned by strangers that just happened to be nearby when the image was captured.

Even with the limited range of present Bluetooth radios it is quite likely that strangers are within BT range in public places. With WLAN technology or with some other technology with longer range the number of meaningless devices increases in proportion to the square of the range (detection area).

FIG. 1 illustrates an arrangement 1 of electronic devices 10, 2, 4, 6. A user device 10 is arranged to store context metadata as a first list 41 when an action such as creation, receipt, editing occurs with respect to a content item 43. The content item may be, for example, a video clip, an image, an audio file, text, a multimedia presentation etc.

The user device 10 comprises a processor 20, a user input device 22 such as a keypad, a memory 24, a display 26 and context detection devices 30 for obtaining context metadata items. The Figure illustrates only as many features as are necessary to explain the implementation of the invention below.

The processor 20 is connected to read from and write to the memory 24, to receive input from the user input device 22 and from the context detection devices 30 and to provide an output to the display 26.

The memory 24 stores computer program instructions 25 which when loaded into the processor 20 enable the user device to operate as described in the following paragraphs. The computer program instructions provide the logic and routines that enables the electronic device 10 to perform the methods illustrated in FIGS. 2 and 3.

The computer program instructions may arrive at the electronic device 10 via an electromagnetic carrier signal or be copied from a physical entity such as a computer program product, a memory device or a record medium such as a CD-ROM (computer disk read-only memory) or DVD (digital versatile disc).

The metadata items 50 and content items 43 are stored in a database 27 in the memory 24. This database also stores information about the associations between metadata items 50 and content items 43.

The context detection devices 30 may include a time/date detector 32 such as a real time clock, a location detector 34 such as a GPS receiver and a proximity detector 36 that detects devices 2, 4, 6 that are proximal to the user device 10. The proximity detector may be a Bluetooth device which communicates with Bluetooth devices 2, 4, 6 or a WLAN, WiMAX (worldwide interoperability for microwave access) or UWB (ultra wide band) device. Alternatively some other proximity radio technology can be utilized to detect nearby devices. In addition, it may also be possible to detect nearby devices if the devices share their location over a (wireless) network.

The context detection devices 30 provide context metadata items to the processor 20. These may include: time, date, location, nearby devices (and for each nearby device its position and/or distance from the user device).

The process of the invention is schematically illustrated in FIGS. 2 and 3.

FIG. 2 illustrates the relationship between a first list 41 of context metadata items 50, which are originally obtained when an action is performed in relation to a content item 43 and a second list 42 of context metadata items which are used to annotate 44 the content item 43. The first list 41 of context metadata items 50 includes contamination, that is, context metadata items 50 that are meaningless to the user of the user device 10. The second list 42 of metadata items 50 comprises a sub-set of the first list 41 and includes those metadata items 50 in the first list 41 that are meaningful. A filter automatically filters the first list 41 of metadata items to identify metadata items in the first list that are probably meaningful and/or to extract automatically metadata items in the first list that are probably meaningful to the second list 42. The content item 43 is annotated by associating 44 each of the metadata items 50 of the second list 42 with the content item 43.

FIG. 3 schematically illustrates the process of annotating a content item with metadata items according to an embodiment of the invention.

At step 60, an action is performed on a content item 43. The action may be, for example, creation, receipt or editing of the content items 43. The content item 43 is, for example, a video clip, an image, an audio file, text etc In responses to step 60, at step 62 a first list 41 of context metadata items 50 is obtained for the content item 43. It is stored in association with that content item in the database 27. If the content item is received at the user device 10, then the context metadata items of the first list 41 may be context metadata items received with the content item 43 and/or context metadata items determined by the context detector devices 30 of the user device 10 on receipt of the content item 43. If the content item 43 is created, then the context metadata items of the first list 41 are those determined by the context detection devices 30 of the user device 10 on creation of the content item 43.

After step 62, at step 64, a second list 42 of context metadata items is obtained from the first list. This is discussed in more detail below. It is stored in association with the content item in the database 27.

Then at step 66, the content item 43 is annotated with the second list 42 by creating an association between the metadata items 50 of the second list and the content item 43.

The step 64 of obtaining a second list 42 of context metadata items 50 from the first list 41 involves filtering of the first list to improve the meaningfulness of the metadata items.

The step 64 may involve a manual step, in which case the first list 41 is displayed, the filter is used to highlight some metadata items over others, and the user selects at least some metadata items from first list 41 for use in the second list 42. The highlighting may be achieved by using a visible score for each metadata item and/or by prioritizing the metadata items according to a score 51. The manual transfer can be performed when the action occurs or at some time afterwards. The presentation is provided by a graphical user interface means in which the context metadata items are displayed on display means 26 for selection by the user using the input means 22, the processor 20 and memory 24 together providing means for the highlighting some of the context metadata items relative to other of the context metadata items to aid user selection of meaningful metadata items.

The step 64 may involve an automated step, in which case, the first list 41 may be but is not necessarily displayed, the filter selects at least some metadata items from first list 41 for use in the second list 42. The filter may use a score 51 for the selection.

The score 51 for a metadata item 50 may depend upon a history of the use of that metadata item for annotating content items 43. For example, the filtering may link a subject metadata item of the first list 41 to content items which it already annotates. This may be achieved by accessing previously stored second lists 42 of metadata in the database 27, and identifying those second lists 42 of metadata in which the subject metadata item of the first list 41 occurs.

Each metadata item 50 may include a score field 51 that identifies, in this example, the number of content items with which that metadata item 50 is already associated. This score field 51 introduces meaningfulness to metadata items 50 by identifying those metadata items the user statistically prefers to use for annotating content items 43. This allows the user to recognize metadata items that are probably more likely to be used from the first list of metadata items for annotation. The metadata items of the first list may be ordered in descending order according to the value of the field 51.

The score 51 for a metadata item 50 may depend upon a history of the appearance of that metadata item in stored first lists 41 that are associated with different content items. This may be achieved by accessing previously stored first lists 41 of metadata in the database 27, and identifying those stored first lists 41 of metadata in which the subject metadata item of the present first list occurs. Each metadata item 50 may include a score field 51 that identifies, in this example, the number of first lists 41 on which that metadata item 50 appears.

The score field 51 may then be used as a criterion by a user for manually transferring metadata items 50 from the first list 41 to the second list 42. Alternatively or in addition, the score field 51 may be used as a criterion for automatically transferring metadata items 50 from the first list 41 to the second list 42 without user intervention. A metadata item 50 is automatically added to the second list 42 if the score field 51 for that metadata item exceeds a threshold value. The threshold value may be different for different content item types. That is the threshold depends upon whether the content item with which the second list of metadata items is to be associated is audio, text, image, video etc. Alternatively or in addition there can be a composite threshold for all or selected groups of content item types.

The score field 51 is especially important for metadata items that represent the identifiers of nearby devices 2,4,6, as the identifier of a device is not always meaningful to a user. When a manual transfer of a device identifier occurs the user may be given an opportunity to amend or augment the content of that metadata item to make it more meaningful or to associate the device identifier with an existing alias/identity/contact or other object describing the device or its owner. Such object can be available e.g. in phonebook, (instant) messaging, publishing or presence application.

The score field 51 may be calculated in other ways as an addition or as an alternative to the way described above. The score field may be made dependent on other attributes than just the number of associations/annotations.

The score may be dependent on, for example, any one or a combination of the following attributes:

a) Number of associations 44 between the metadata item and other content items 43. The larger the number of associations the greater the score 51 and the smaller the number of associations the smaller the score 51. The associations may occur as a result of the appearance of the metadata item in a plurality of first lists 41. Alternatively, the associations may occur as a result of the appearance of the metadata item in a plurality of second lists 42.

b) How recently associations 44 between the metadata item and other content items have been made. More weight is given to more recent associations compared to older associations. The associations may occur as a result of the appearance of the metadata item in a plurality of first lists 41. Alternatively, the associations may occur as a result of the appearance of the metadata item in a plurality of second lists 42.

c) The type of action that occurs for a content item and/or the content type E.g. capturing an image/video, recording a sound clip, receiving a message, editing, etc.

d) For a device identifier, a distance and/or direction of the device represented by the device identifier relative to the user's device when the action occurs for the content item. If the distance is large or if the device is behind the user, when the action is capturing images/videos, the weighting of the score will be low. However, if the distance is very small and/or the device is in front of the user, when the action is capturing images/videos, the weighting of the score will be high. To implement this option, the first list of metadata items will include for each nearby device metadata that provides the device identifier of the nearby device and also metadata that provides the distance and/or direction to that nearby device.

The local environment of the device from which content metadata item is obtained may also be used in score calculation. The environment may include the number of devices, distance and/or direction, score for nearby devices.

As an example, for a device identifier, the number of devices, distance and/or direction of other devices nearby when the action occurs for the content item. These attributes can be used to detect whether the device that provided the device identifier is in the middle of a big crowd in which case the score is given a low weighting or whether the device is one of a few devices in which case the score is given a greater weighting. To implement this option, the first list of metadata items will include for each nearby device metadata that provides the device identifier of the nearby device and also metadata that provides the distance and/or direction to that nearby device.

As a further example, for a device identifier, the number of devices, distance and/or direction of high scoring devices nearby the device represented by that device identifier when the action occurs for the content item. High scoring means any device whose device identifier has already been added to the second list or whose device identifier has a high score field. If a device is detected in the middle of or near high scoring devices, its score can be weighted highly.

More complex mechanisms for determining a score may additionally or alternatively be used. For example, the score associated with a device identifier may be dependent upon the score the device represented by that device identifier has for the user device 10. For each device identifier in the first list 41, the user device sends a score request message to the device represented by that device identifier (target device). The score message includes the device identifier of the user's device. The target device either retrieves the score associated with the received device identifier or calculates a score for that device identifier. It then replies with a score reply message to the user's device which includes the calculated score. The user's device weights the score for a device identifier in dependence upon the score received in the score reply message received from the respective device. The higher the score received, the higher the weighting applied to the score of the device identifier.

Thus if the user's device is considered meaningful by another nearby device in the first list 41 that other device may be added to the second list 42 which includes the meaningful devices. Thus devices that consider you meaningful may be added to your second list of meaningful devices.

As a further option, the score reply message may additionally or alternatively include the identities of the highest scoring device identifiers of the target device. The device identifiers present in the first list that are also present in such a score reply message are automatically transferred to the second list or their score is heavily weighted. A further metadata item, a marker, may be associated with a device identifier that is added to the second list in this way. This marker is also transferred in the score reply message and is increased by one each time it is received. The device identifier score received in a score reply message at a user device is only valid for increasing the score of that device identifier if the marker is less than a predefined threshold.

An augmentation process may also occur on the second list at step 64. This process adds user recognizable meaning to apparently meaningless metadata items in the second list.

For example, instead of or in addition to giving a co-ordinate for a location the coordinate may be represented as a region name. The region name may correspond to the smallest geographic region previously used by the user device that is accurate for this location. Alternatively, or additionally, the location may be compared against the locations of addresses stored within a Contacts database. The location may then be given as, for example, 'near John Doe's home', if John Doe's home address is the nearest address in the Contacts database and is within a threshold distance.

For example, instead of or in addition to giving a date and time, the date and time may be represented as period relative to an entry in a calendar application. If the date and time corresponds to a meeting with John, then the user device may additional provide as metadata 'Meeting with John at his office' or if the date and time follows the meeting, the user device may provide the additional metadata 'after meeting with John at his office'

The different options for additional metadata may be presented for selection by the user.

The filtering results in a second list of metadata items which are meaningful to the user device. The second list may be presented to the user. The augmentation process may further improve the meaningfulness of the metadata items presented to the user.

An organizer application can be used to organize/manage the stored content items 43 using their respective second lists 42 of metadata items 50. A search facility may be based upon the metadata items in the second lists 42.

Although embodiments of the present invention have been described in the preceding paragraphs with reference to various examples, it should be appreciated that modifications to the examples given can be made without departing from the scope of the invention as claimed.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
    obtaining by an apparatus a first list of context metadata items for a content item where the context metadata items comprises information relating to devices which were nearby the apparatus when the content item was created;
    obtaining a second list of context metadata items, wherein the second list comprises a plurality, but not all, of the metadata items of the first list and comprises information relating to at least one device which was nearby the apparatus when the content item was created; and
    annotating the content item with the second list comprising information relating to at least one device which was nearby the apparatus when the content item was created by creating an association between each of the metadata items of the second list and the content item,
    wherein obtaining the second list of context metadata items from the first list comprises processing the first list to improve the meaningfulness of the metadata items, wherein the processing comprises the addition of metadata that is dependent upon previously stored metadata, the additional metadata comprising a score, wherein the score for a metadata item that has been received from a device depends upon a local environment of that device.

2. The method as claimed in claim 1, wherein the additional metadata comprises user meaningful information based on data obtained from a personal database.

3. The method as claimed in claim 1, further comprising:
    displaying the first list;

highlighting some metadata items in the first list compared to other metadata items in the first list; and enabling user selection of at least some metadata items from the first list for use in the second list.

4. The method as claimed in claim 3, wherein highlighting may be achieved by using visible scores for metadata items.

5. The method as claimed in claim 3, wherein highlighting may be achieved by prioritizing the metadata items according to a score.

6. The method as claimed in claim 1 wherein processing automatically selects at least some metadata items from the first list for use in the second list.

7. The method as claimed in claim 6, wherein metadata items in the first list are scored and the scores are used as a selection criterion.

8. The method as claimed in claim 1, wherein obtaining the second list of context metadata items from the first list involves scoring of the metadata items of the first list.

9. The method as claimed in claim 1, wherein a score for a metadata item depends upon a history of the use of that metadata item for annotating content items.

10. The method as claimed in claim 9, wherein the score for a metadata item depends on the number of times that metadata item has previously been used for annotating content items.

11. The method as claimed in claim 9, wherein the score for a metadata item depends on how recently that metadata item has been used for annotating content items.

12. A method as claimed in claim 9, wherein determining a score for a metadata item comprises accessing a plurality of previously stored lists of metadata items and identifying those previously stored lists of metadata items in which that metadata item occurs.

13. The method as claimed in claim 1, wherein the score for a metadata item that has been received from the device depends upon the score that device has for a metadata item corresponding to another device.

14. The method as claimed in claim 1 wherein the second list may comprise metadata items not present in the first list.

15. A non-transitory computer readable medium having a computer program stored thereon for performing the method of claim 1 when executed on a processor.

16. A tangible physical entity embodying a computer program for carrying out the method as claimed in claim 1.

17. The method as claimed in claim 1, wherein the nearby devices were within a distance covered by short range communication when the content item was created.

18. The method as claimed in claim 17, wherein the short range communication is Bluetooth, Wireless Local Area Network (WLAN), Worldwide Interoperability for Microwave Access (WiMAX), or Ultra Wide Band (UWB).

19. A method as claimed in claim 1, wherein obtaining the first list comprises receiving one or more identifiers transmitted by local radio devices.

20. A method as claimed in claim 1, wherein the information relating to devices which were nearby the apparatus when the content item was created comprises the position of the nearby devices and/or distance from the apparatus to the nearby devices.

21. A method as claimed in claim 1, wherein the second list of context metadata items comprises a sub-set of the first list of context meta-data items and includes those metadata items in the first list of context metadata items that are meaningful.

22. A method as claimed in claim 1, wherein a metadata item is automatically added to the second list if the score for the metadata item exceeds a threshold value.

23. A method as claimed in claim 1, wherein the score for a device identifier is dependent upon a distance and/or direction of the device represented by the device identifier relative to the apparatus when the content item is created.

24. A method as claimed in claim 1, comprising performing an augmentation process on the second list of context metadata items.

25. An electronic device comprising:
a processor; and
a memory comprising computer program code;
the memory and the computer program code configured to, with the processor, cause the electronic device at least to perform:
obtaining a first list of context metadata items for a content item where the context metadata items comprise information relating to devices which were nearby the electronic device when the content item was created;
obtaining a second list of context metadata items, wherein the second list comprises a plurality, but not all, of the metadata items of the first list and comprises information relating to at least one device which was nearby the electronic device when the content item was created; and
annotating the content item with the second list comprising information relating to at least one device which was nearby the electronic device when the content item was created by creating an association between each of the metadata items of the second list and the content item,
wherein obtaining the second list of context metadata items from the first list comprises processing the first list to improve the meaningfulness of the metadata items, wherein the processing comprises the addition of metadata that is dependent upon previously stored metadata, the additional metadata comprising a score, wherein the score for a metadata item that has been received from a device depends upon a local environment of that device.

26. The electronic device as claimed in claim 25, wherein the device is hand-portable.

27. A non-transitory computer readable medium having a computer program stored thereon for annotating content items with context metadata where the context metadata comprises information relating to devices which were nearby an apparatus when the content item was created, said program comprising computer program instructions which when loaded into a processor enable the processor to cause the apparatus to:
obtain a second list of context metadata items, wherein the second list comprises a plurality, but not all, of the metadata items of a first list and comprises information relating to at least one device which was nearby the apparatus when the content item was created; and
annotate the content item with the second list comprising information relating to at least one device which was nearby the electronic device when the content item was created by creating an association between each of the metadata items of the second list and the content item,
wherein obtaining the second list of context metadata items from the first list comprises processing the first list to improve the meaningfulness of the metadata items, wherein the processing comprises the addition of metadata that is dependent upon previously stored metadata, the additional metadata comprising a score, wherein the score for a metadata item that has been received from a device depends upon a local environment of that device.

28. The non-transitory computer readable medium as claimed in claim 27, wherein the additional metadata comprises user meaningful information based on data obtained from a personal database.

29. The non-transitory computer readable medium as claimed in claim 27, further comprising computer program instructions for:
   displaying the first list;
   highlighting some metadata items in the first list compared to other metadata items in the first list; and
   enabling user selection of at least some metadata items from the first list for use in the second list.

30. The non-transitory computer readable medium as claimed in claim 27 further comprising computer program instructions for automatically selecting at least some metadata items from the first list for use in the second list.

31. A method comprising:
   obtaining by an apparatus a first list of context metadata items for a content item where the context metadata items comprises information relating to devices which were nearby the apparatus when the content item was created, the information comprising the position of the nearby devices and/or distance from the apparatus to the nearby devices;
   obtaining a second list of context metadata items, wherein the second list comprises a plurality, but not all, of the metadata items of the first list and comprises information relating to at least one device which was nearby the apparatus when the content item was created; and
   annotating the content item with the second list comprising information relating to at least one device which was nearby the apparatus when the content item was created by creating an association between each of the metadata items of the second list and the content item,
   wherein obtaining the second list of context metadata items from the first list comprises processing the first list to improve the meaningfulness of the metadata items, wherein the processing comprises the addition of metadata that is dependent upon previously stored metadata comprising a score, wherein the score for a metadata item that has been received from a device depends upon a local environment of that device.

\* \* \* \* \*

UNITED STATES PATENT AND TRADEMARK OFFICE
CERTIFICATE OF CORRECTION

PATENT NO. : 9,727,564 B2
APPLICATION NO. : 12/086667
DATED : August 8, 2017
INVENTOR(S) : Sorvari et al.

Page 1 of 1

It is certified that error appears in the above-identified patent and that said Letters Patent is hereby corrected as shown below:

On the Title Page

Item (73) Assignee: "Nokia Technology Oy" should read --Nokia Technologies Oy--.

Signed and Sealed this
Third Day of April, 2018

Andrei Iancu
*Director of the United States Patent and Trademark Office*